July 31, 1934.  A. S. HICKERSON  1,968,644
RACK
Filed April 7, 1933

Inventor
Absalom S. Hickerson
By
Hardway Ratley
Attorneys

Patented July 31, 1934

1,968,644

UNITED STATES PATENT OFFICE 1,968,644

RACK

Absalom S. Hickerson, Baytown, Tex.

Application April 7, 1933, Serial No. 664,893

2 Claims. (Cl. 211—178)

This invention relates to a rack, and has particular relation to a collapsible or foldable rack, specially designed for use as a hanger for drying clothes, and the like.

An object of the invention is to provide a rack of the character described embodying supporting legs which are foldable together and having cross slats spaced apart and pivoted to said legs on which clothing and the like may be hung for drying purposes.

Another object of the invention is to provide novel means for preventing the collapsing of the rack when the same is in use.

Another object is to provide a rack having supporting legs which may be folded together with supporting bars spaced apart on the legs and pivotally connected thereto whereby the rack may be collapsed when said legs are in folded position.

With the above and other objects in view, the invention has particular relation to certain novel features of construction, arrangement of parts and use, an example of which is given in this specification and illustrated in the accompanying drawing, wherein.

Figure 1:
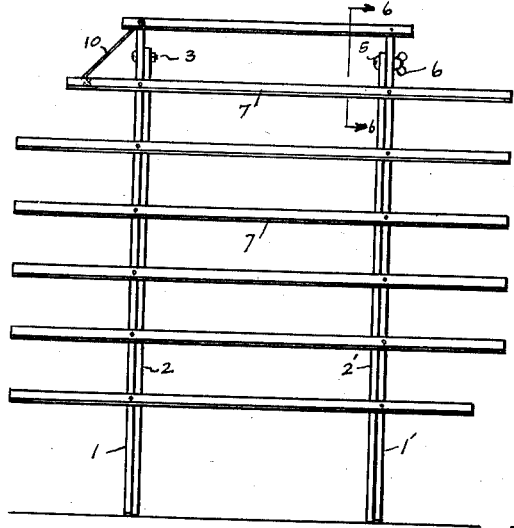
Figure 1 shows a side view of the rack as in use.
Figure 2:
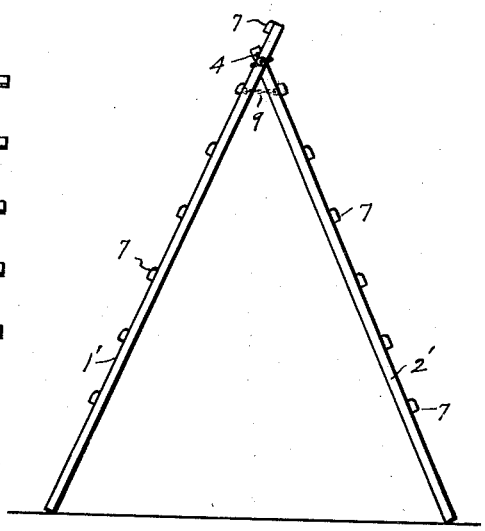
Figure 2 shows an end view thereof.

In the drawing, the numerals 1, 1' designate the front legs of the rack and the numerals 2, 2' designate the rear legs.

The front and rear legs 1, 2 are pivoted together near their upper ends by the bolt 3, having the usual head at one end and nut at the other end. The leg 2' has a longitudinal bearing slot 4 at its upper end and a bolt 5 is fitted through said slot and through an aligned bearing in the leg 1' and has a wing nut 6 threaded onto the outer end thereof. The front legs 1, 1' as well as the rear legs 2, 2' have the cross slats 7 fastened thereto, preferably by suitable bolts as 8, said slats having pivotal connections with said respective legs.

Figure 7:
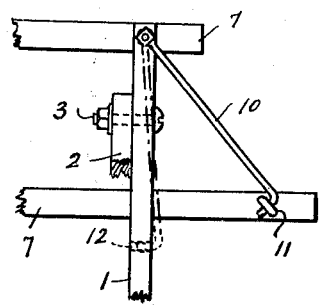
Figure 7 shows a fragmentary side elevation of the rack showing the anchor hook employed.

In use the lower ends of the legs 1, 1', 2, 2' are spread apart, and there is a flexible tie such as a chain 9 whose ends are attached to opposing slats 11 and which limits the outward movements of the legs, but which permits said legs to be folded or nested together. Pivotally connected to the upper end of one of the front legs there is a hook 10 and the slat 7 beneath has an eye 11 in which said hook may be engaged to brace the rack and to hold it against collapsing laterally when in use. The leg to which said hook is attached may be provided with a socket 12 to receive the hook when the hook is not being used, as indicated in dotted lines in Figure 7.

When the rack is in use clothing and the like to be dried may be suspended from the respective slats 7.

Figures 3, 4, 5:
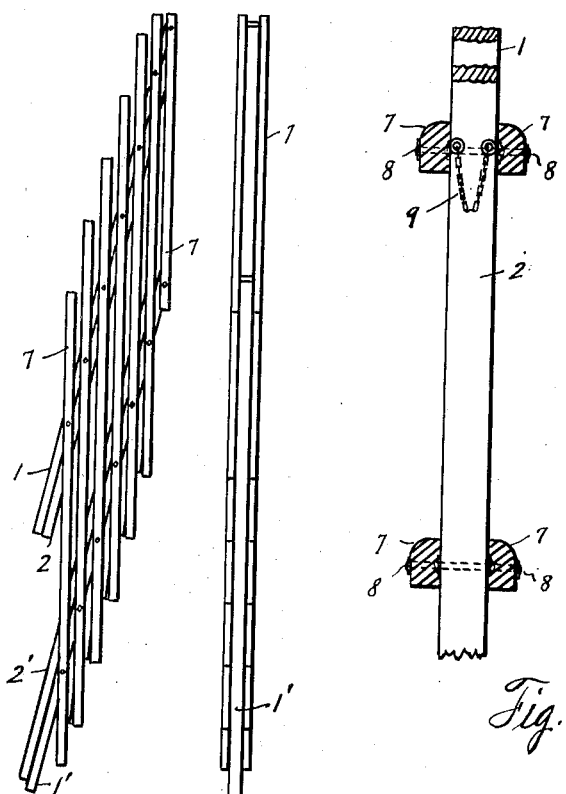
Figure 3 shows a side view of the rack in collapsed position.
Figure 4 shows an end view of the collapsed rack.
Figure 5 shows a fragmentary vertical sectional view of the rack in collapsed position.
Figure 6:
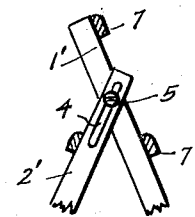
Figure 6 shows a fragmentary sectional view taken on the line 6—6 of Figure 1.

When the rack is in use the wing nut 6 should be screwed up tight so as to brace the rack and to assist in holding it against collapsing. When it is desired to collapse the rack the wing nut 6 may be loosened and the legs 2, 2' swung into transverse alignment with the front legs 1, 1' as shown in Figure 5 and the hook 10 should be released from the eye 11 and inserted into the bearing 12. The legs 1, 2 may then be elevated relative to the legs 1', 2' and swung over toward said last mentioned legs into the position shown in Figures 3 and 4, the slats 7 assuming a diagonal relation to said legs. During this movement the leg 1' will move downwardly relative to the leg 2' the bolt 5 sliding along the bearing slot 4'. This longitudinal movement of the leg 1' relative to the leg 2' permits the legs 1, 2 to be moved into position alongside the legs 1', 2' and is one of the important features of the invention.

When the rack has been collapsed it may be readily handled and stored for further use or for shipment, thus occupying small space and being readily packed or stored away.

The drawing and description disclose what is now considered to be a preferred form of the invention by way of illustration only while the broad principle of the invention will be defined by the appended claims.

What I claim is:

1. A drying rack comprising a pair of front legs and a pair of rear legs the corresponding front and rear legs being pivoted together adjacent their upper ends, one pair of legs being closer together than those of the other pair, the connection of one of said front legs with its rear leg being slidable, series of front and rear cross slats pivotally connected to the respective front and rear legs, the front and rear slats being of unequal length between the pivots, a slat and a leg being provided one with a hook and the other with an eye to receive said hook.

2. A drying rack comprising a pair of front legs spaced apart, a pair of rear legs spaced apart, one pair of said legs being located inside of the other pair of legs, the corresponding legs at one side of the rack being pivoted together adjacent their upper ends and the corresponding legs at the other side of the rack being provided adjacent their upper ends one with an elongated slot providing a bearing and the other with a bolt which works in said bearing, front and rear cross slats pivoted to said front and rear pair of legs, the front and rear slats being of unequal length between their pivots.

ABSALOM S. HICKERSON.